United States Patent
Hashimoto et al.

(10) Patent No.: US 8,297,817 B2
(45) Date of Patent: Oct. 30, 2012

(54) LAMP INSTALLATION STRUCTURE FOR VEHICLE

(75) Inventors: Hidenao Hashimoto, Fujisawa (JP); Masaji Takei, Fujisawa (JP); Hiromi Takei, legal representative, Chigasaki (JP)

(73) Assignee: Isuzu Motors Limited, Tokyo (JP)

( * ) Notice: Subject to any disclaimer, the term of this patent is extended or adjusted under 35 U.S.C. 154(b) by 418 days.

(21) Appl. No.: 12/515,199

(22) PCT Filed: Nov. 19, 2007

(86) PCT No.: PCT/JP2007/072398
§ 371 (c)(1),
(2), (4) Date: Feb. 23, 2010

(87) PCT Pub. No.: WO2008/062758
PCT Pub. Date: May 29, 2008

(65) Prior Publication Data
US 2010/0202155 A1    Aug. 12, 2010

(30) Foreign Application Priority Data
Nov. 24, 2006    (JP) .................................. 2006-316794

(51) Int. Cl.
*B60Q 1/00*    (2006.01)
(52) U.S. Cl. ..................................................... 362/546
(58) Field of Classification Search .................. 362/546, 362/549
See application file for complete search history.

(56) References Cited

U.S. PATENT DOCUMENTS

| 2,640,910 | A | * | 6/1953 | Talley | 362/546 |
| 4,186,645 | A | * | 2/1980 | Zaydel | 411/55 |
| 6,220,732 | B1 | * | 4/2001 | Paffrath | 362/496 |
| 6,361,197 | B1 | * | 3/2002 | Katsumata et al. | 362/546 |

FOREIGN PATENT DOCUMENTS

| JP | 06-006094 U | 1/1994 |
| JP | 06-020134 U | 3/1994 |
| JP | 06-025030 U | 4/1994 |
| JP | 2000-118292 A | 4/2000 |
| JP | 2002-211308 A | 7/2002 |
| JP | 2003-182447 A | 7/2003 |
| JP | 2003-306073 A | 10/2003 |

* cited by examiner

*Primary Examiner* — Julie Shallenberger

(57) ABSTRACT

A lamp installation structure 1 includes a lamp installation portion 3, a clip member 10, a lamp body 21 and a screw member 30. The clip member is attached to the lamp body 21 in a way that the screw member 30 is inserted into a screw insertion hole 14, and that a tip 31 of the screw member 30 is meshed with a meshing portion 27. A turn lamp 20 is installed in the lamp installation portion 3 in a way that one end 11a of a base portion 11 of the clip member 10 is inserted into an attachment hole 4, and that an engagement portion 12 and a flange portion 13 are respectively engaged with the back surface side and the front surface side of the lamp installation portion 3.

2 Claims, 4 Drawing Sheets

LAMP INSTALLATION STRUCTURE FOR VEHICLE

TECHNICAL FIELD

The present invention relates to a lamp installation structure for vehicle.

BACKGROUND ART

A structure has been known in which a lamp body is installed in a vehicle body with screw fastening.
Patent Document 1: Japanese Utility Model Application Laid-open Publication No. Hei 6-20134

DISCLOSURE OF THE INVENTION

Problems to be Solved by the Invention

The above-described structure, however, has a problem that installation workability in a production line is poor because the lamp body is positioned in the vehicle body, and then fastened with a screw. Meanwhile, in a case where the lamp body is installed in the vehicle body with clip fastening, there arises no problem in productivity, because positioning and installation are carried out simultaneously. However, there arises a problem that the clip may be damaged by repetition of the removal and the installation.

Accordingly, an object of the present invention is to provide a lamp installation structure which can facilitate installation of a lamp body into a vehicle body in a production line, and which can eliminate load on components in removing the lamp body.

Means for Solving the Problems

To achieve the above object, the present invention includes a vehicle body lamp installation portion, a connection member, a screw member and a lamp body to be mounted with a lamp. The lamp installation portion includes an attachment hole penetrating therethrough from the front surface side to the back surface side. The connection member includes a base portion, an engagement portion and a screw insertion hole. The base portion has one end inserted into the attachment hole from the front surface side of the lamp installation portion. The engagement portion engages with the lamp installation portion so as to prevent the base portion from being detached from the attachment hole, when the one end of the base portion is inserted into the attachment hole. The screw insertion hole penetrates the base portion from the one end to the other end. The screw member is inserted into the screw insertion hole from the one end of the base portion. The lamp body includes a meshing portion meshing with a tip of the screw member inserted into the screw insertion hole, the tip protruding from the other end of the base portion. The connection member is attached to the lamp body in a way that the screw member is inserted into the screw insertion hole and the tip of the screw member is meshed with the meshing portion. The lamp body is installed in the lamp installation portion in a way that the one end of the base portion of the attached connection member is inserted into the attachment hole, and the engagement portion and the lamp installation portion are engaged with each other.

In the above-described configuration, the connection member is attached to the lamp body in a way that the screw member is inserted into the screw insertion hole and the tip of the screw member is meshed with the meshing portion. The lamp body is installed in the lamp installation portion in a way that the one end of the base portion of the connection member is inserted into the attachment hole, and the engagement portion and the lamp installation portion are engaged with each other. Accordingly, the lamp body is positioned and installed in the vehicle body simultaneously by inserting the connection member into the attachment hole, whereby assembling workability in a production line is improved.

Meanwhile, for parts replacement or inspection, while the lamp body is kept installed in the vehicle body, the screw member is turned from the back surface side of the lamp installation portion in the loosening direction to thereby remove the lamp body from the connection member. This enables removal of the lamp body from the vehicle body, while the connection member is left on the vehicle body lamp installation portion. In addition, no excessive load is applied on the connection member in removing the lamp body, whereby durability of the connection member is improved.

In addition, when the lamp body removed from the vehicle body for parts replacement or inspection is reinstalled in the vehicle body, the installation can be performed as follows. Specifically, positioning is performed by placing the lamp body so that the screw meshing portion of the lamp body can correspond to the connection member attached to the lamp installation portion, and the screw member is inserted into the screw insertion hole of the connection member from the back surface side of the lamp installation portion and is turned in the fastening direction.

Meanwhile, one of the lamp installation portion and the lamp body may be provided with a hooking hole, and the other one of the lamp installation portion and the lamp body may be provided with a fall prevention claw which is inserted through the hooking hole in a state where the lamp body is installed in the lamp installation portion. When the lamp body is disengaged from the lamp installation portion, the fall prevention claw is hooked on a periphery of the hooking hole to thereby prevent the lamp body from falling.

With the above-described configuration, when the lamp body is disengaged from the connection member of the lamp installation portion, the fall prevention claw is hooked on the periphery of the hooking hole, whereby the falling of the lamp body can be prevented. In addition, when the above-described removed lamp body is reinstalled in the lamp installation portion, the fall prevention claw is hooked on the hooking hole, whereby the lamp body is temporarily held by the lamp installation portion. Accordingly, workability is excellent in reinstalling the lamp body in the lamp installation portion.

In addition, the meshing portion, the screw member and the connection member each may be provided in a plurality, and the plurality of meshing portions may be provided near a reference edge among edges of the lamp body. The reference edge is used as a positioning reference between the lamp body and the lamp installation portion. Each of the plurality of connection members is attached to the corresponding one of the plurality of meshing portions with a screw member. The plurality of attachment holes are located at respective predetermined positions so as to correspond to the plurality of meshing portions.

In the above-described configuration, the lamp body is installed in the lamp installation portion in a way that the engagement portion of each of the connection members attached to the corresponding one of the plurality of meshing portions near the reference edge is inserted into the corresponding attachment hole. In other words, the lamp body is positioned near the reference edge. Accordingly, when another component is placed in contact with the lamp lens fixed to the lamp body and the outer edge of the lamp lens and the outer edge of the component are adjacent to each other, the portion in contact with the component among the edges of the lamp body is used as the reference edge, whereby variation in position of the above-described outer edge of the lamp lens relative to the above-described outer edge of the component can be limited to a small range. As a result, visual appearance is enhanced.

Effects of the Invention

According to the present invention, installation of the lamp body into the vehicle body in a production line is facilitated and load on the connection member is eliminated in removing the lamp body.

EXPLANATION OF REFERENCE NUMERALS

Figure 1:
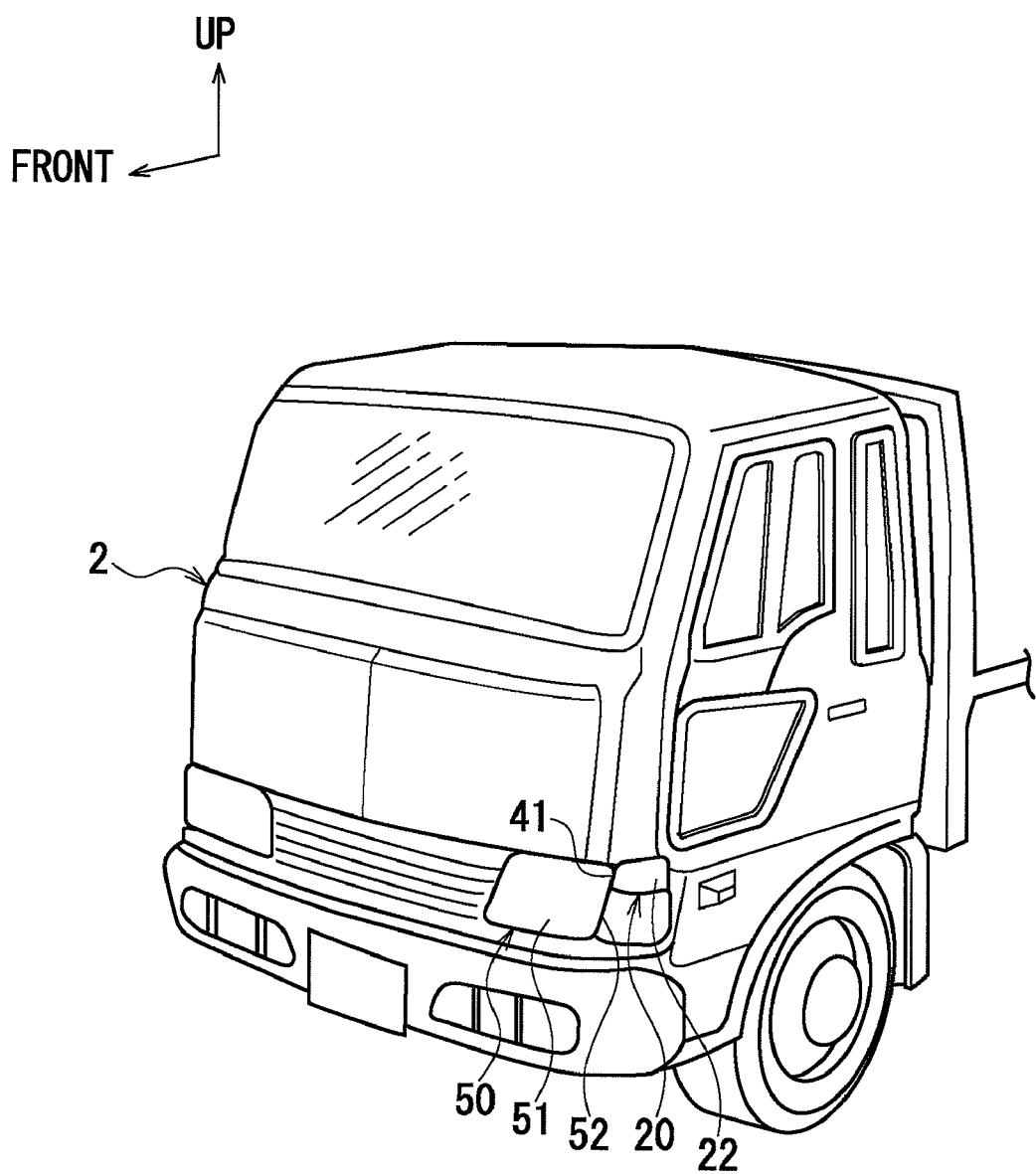
FIG. 1 is an exterior perspective view showing a vehicle according to the present embodiment.

1 Lamp installation structure
2 Vehicle body
3 Lamp installation portion
4 Attachment hole
5 Hooking hole
10 Clip member (Connection member)
11 Base portion
11a One end
11b The other end
12 Engagement portion
13 Flange portion
14 Screw insertion hole
20 Turn lamp
21 Lamp body
22 Lamp lens
23 Reflector
24 Lamp bulb housing
25 Lamp bulb
26 Clip member insertion portion
27 Screw meshing portion
28 Fall prevention claw
30 Screw member
31 Tip
32 Head
40 Reference edge
41 Outer edge
50 Head lamp
51 Lamp lens
52 Outer edge

BEST MODES FOR CARRYING OUT THE INVENTION

Figure 2:
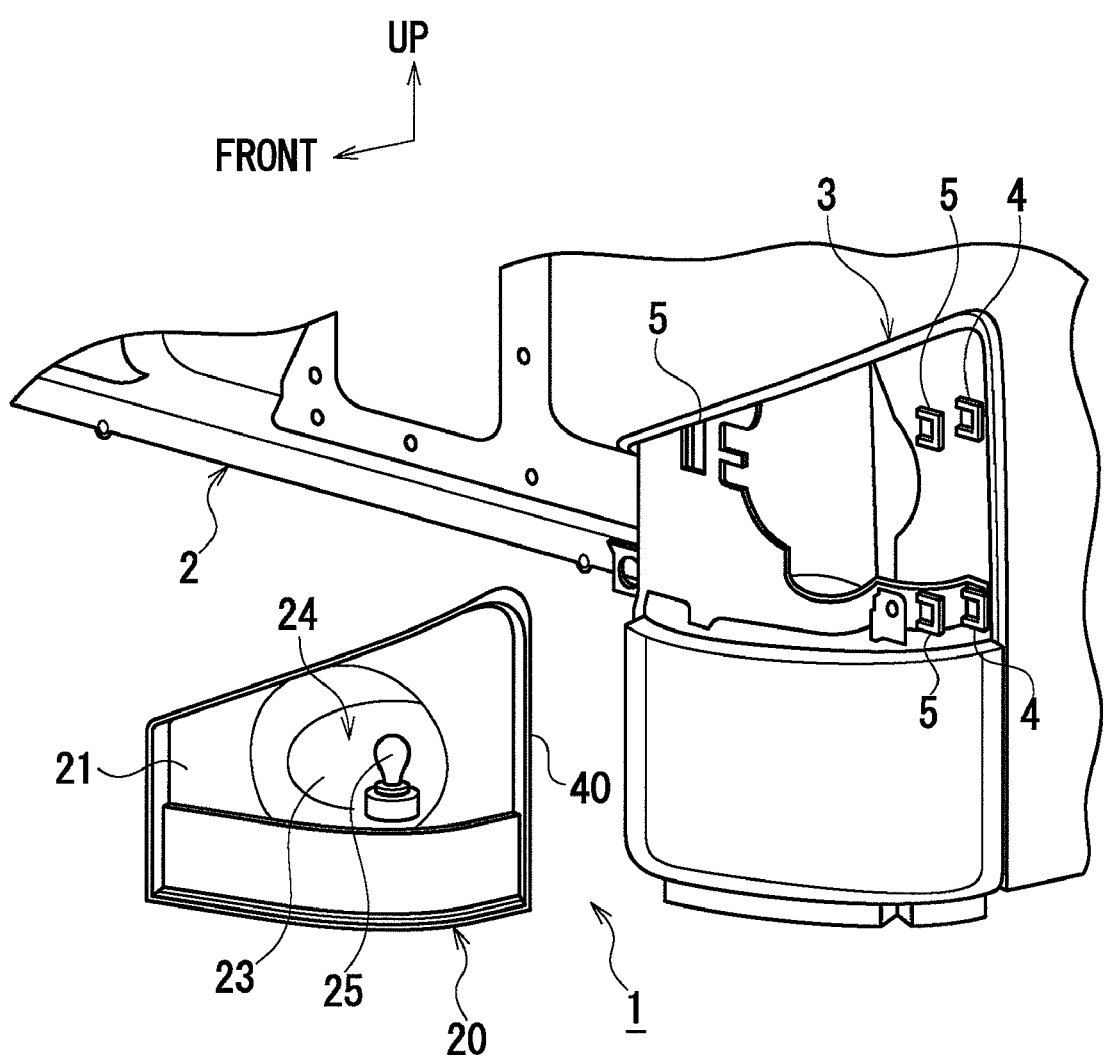
FIG. 2 is an exploded perspective view showing a lamp installation structure.
Figure 3:
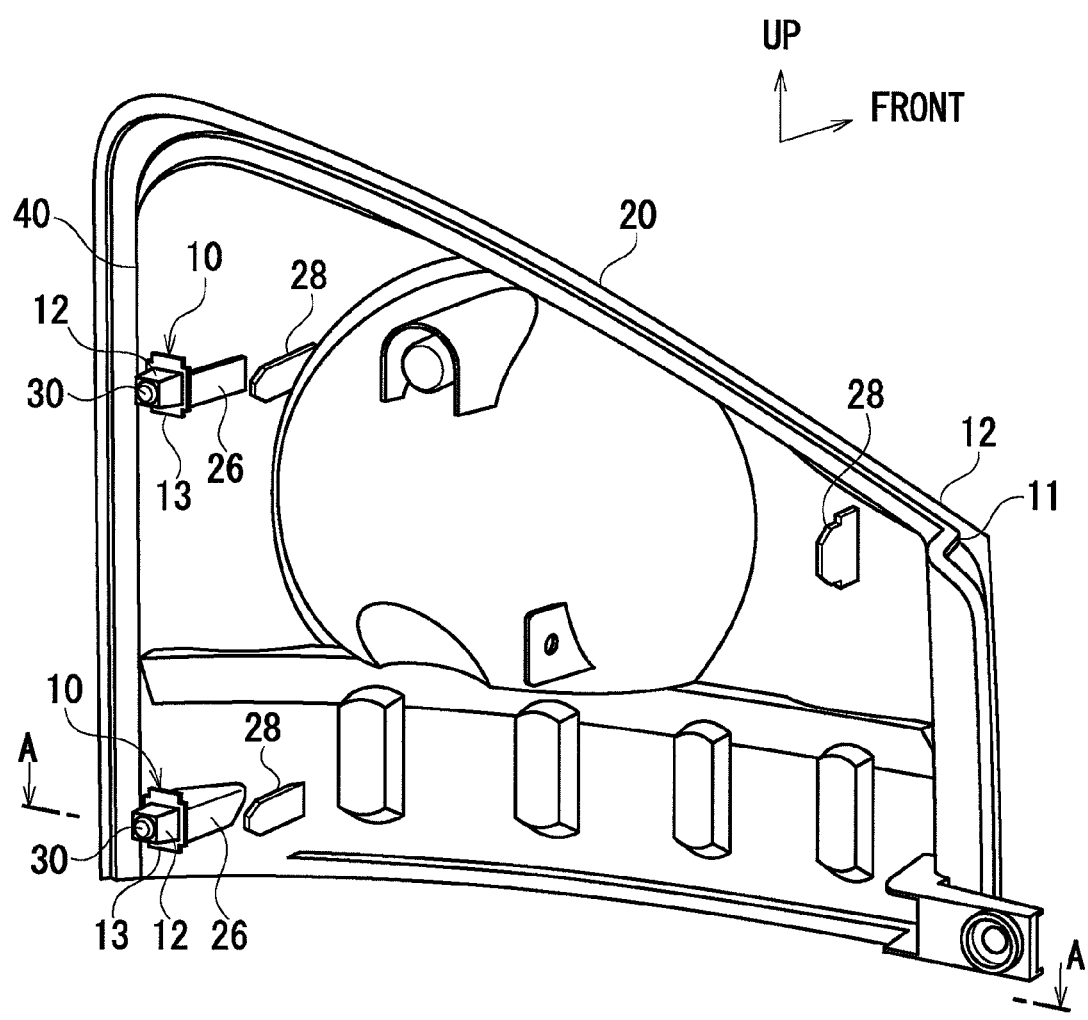
FIG. 3 is an outline perspective view showing the back surface side of a turn lamp with clip members attached thereto.
Figure 4:
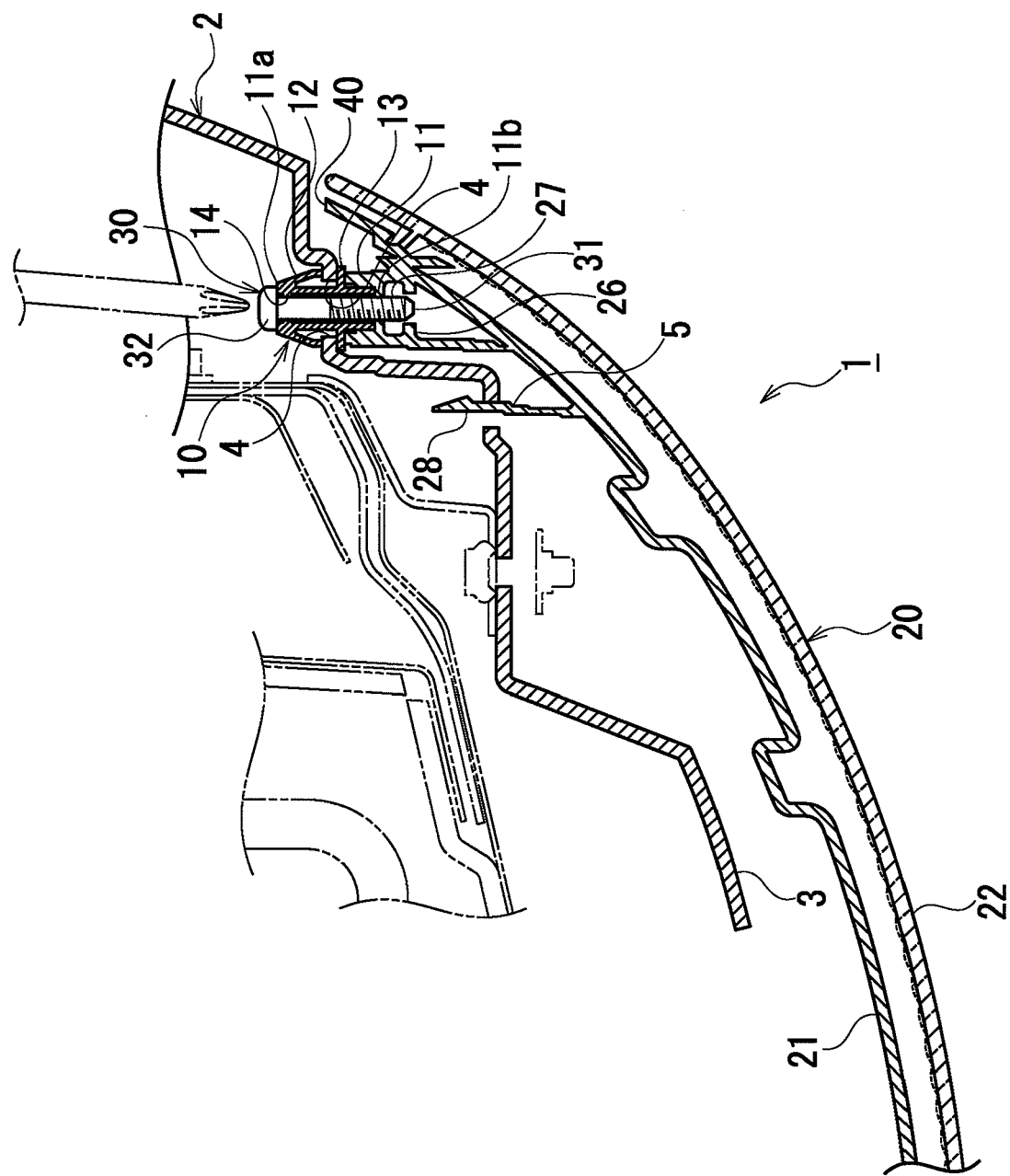
FIG. 4 is a cross sectional view taken along the line A-A of FIG. 3 showing a state where the turn lamp is installed in a vehicle body.

Hereinafter, an embodiment of the present invention is described on the basis of the drawings. FIG. 1 is an exterior perspective view showing a vehicle according to the present embodiment. FIG. 2 is an exploded perspective view showing a lamp installation structure. FIG. 3 is a schematic perspective view showing the back surface side of a turn lamp with clip members attached thereto. FIG. 4 is a cross sectional view taken along the line A-A of FIG. 3 showing a state where the turn lamp is installed in a vehicle body. Not that, in the drawings, "UP" represents the vehicle upward direction, and "FRONT" represents the vehicle frontward direction.

As shown in FIGS. 1 to 4, a lamp installation structure for vehicle 1 includes: a lamp installation portion 3; clip members 10, which are connection members; a turn lamp 20; and screw members 30.

The lamp installation portion 3 is formed on an outer side, in the vehicle width direction, of the front of a vehicle body 2. Two attachment holes 4 are formed at upper and lower positions on an outer side, in the vehicle width direction, of the lamp installation portion 3 so as to penetrate therethrough from the front surface side to the back surface side. Three hooking holes 5 are formed at positions near the attachment holes 4 and at an inner side thereof in vehicle width direction so as to penetrate through the lamp installation portion 3 from the front surface side to the back surface side.

Each of the clip members 10 is formed of a resinous member, and includes a base portion 11, an engagement portion 12, a flange portion 13 and a screw insertion hole 14. The base portion 11 has a substantially rectangular cylindrical shape. The engagement portion 12 is formed in one end 11a of the base portion 11. The flange portion 13 extends outward from a periphery between the one end 11a and the other end 11b of the base portion 11. The screw insertion hole 14 penetrates through the base portion 11 from the one end 11a to the other end 11b.

The turn lamp 20 include: a lamp body 21; a lamp lens 22 covering a front opening of the lamp body 21; a reflector 23 provided on the front surface side of the lamp body 21 and reflecting light; a lamp bulb housing 24 defined and formed by the reflector 23 and the lamp lens 22; and a lamp bulb 25 provided in the lamp bulb housing 24.

Two clip member insertion portions 26 are formed at upper and lower positions on an outer side, in the vehicle width direction, of the back surface of the lamp body 21. The other end 11b of the base portion 11 of the clip member 10 is inserted into the clip member insertion portion 26. A screw meshing portion 27 which can mesh with the screw member 30 is formed inside each of the clip member insertion portions 26. Three fall prevention claws 28 are formed at positions near the clip member insertion portion 26 and on an inner side, in the vehicle width direction, of the back surface of the lamp body 21. Each of the fall prevention claws 28 can be hooked on the periphery of the hooking hole 5.

Here, description will be made of installation of the turn lamp 20 into the lamp installation portion 3 of the vehicle body 2.

First, the other end 11b of the base portion 11 of the clip member 10 is inserted into the clip member insertion portion 26 of the lamp body 21 in the turn lamp 20. The screw member 30 is inserted into the screw insertion hole 14 from the one end 11a of the base portion 11 of the clip member 10. Then, the screw member 30 is turned in the fastening direction and thus a tip 31 of the screw member 30 is meshed with the screw meshing portion 27 to thereby attach each of the clip members 10 to the lamp body 21.

Next, the one end 11a of the base portion 11 of the clip member 10 attached to the above-described lamp body 21 is inserted into the corresponding attachment hole 4 of the lamp installation portion 3 in the vehicle body 2. As a result, the engagement portion 12 of the clip member 10 bends and deforms, whereby the engagement portion 12 and the flange portion 13 are respectively engaged with the back surface side and the front surface side of the lamp installation portion 3. Thus, the turn lamp 20 is installed in the lamp installation portion 3.

When the turn lamp 20 installed in the lamp installation portion 3 is removed for parts replacement or inspection, ahead 32 of the screw member 30 is turned in a loosening direction from the back surface side of the lamp installation portion 3 by use of a screw-driver or the like. When the tips 31 of the screw members 30 are released from the screw meshing portions 27, the turn lamp 20 can be removed from the clip member 10. In this state, the clip members 10 still remain in the lamp installation portion 3 of the vehicle body 2. Note that, when the tips 31 of the screw members 30 are released from the screw meshing portions 27, the turn lamp 20 is moved by its own weight in such a direction as to be disengaged from the clip members 10. However, the fall prevention claws 28 are hooked on the peripheries of the hooking holes 5, whereby the turn lamp 20 does not fall.

When the turn lamp 20 removed for parts replacement or inspection is reinstalled in the lamp installation portion 3, first, positioning is performed in a way that the other end 11b of the base portion 11 of each of the clip members 10 remaining in the lamp installation portion 3 is inserted into the corresponding clip member insertion portion 26 of the lamp body 21 of the turn lamp 20. In this state, the fall prevention claws 28 are inserted into the hooking holes 5 and are hooked on the peripheries of the hooking holes 5, whereby turn lamp 20 is temporarily held by the lamp installation portion 3. Then, the screw member 30 is inserted into each of the screw insertion holes 14 from the one end 11a of the base portion 11 of the clip member 10, and the screw member 30 is turned in the fastening direction to thereby mesh the tip 31 of the screw member 30 with the screw meshing portion 27. Thus, the turn lamp 20 is reinstalled in the lamp installation portion 3.

As described above, according to this embodiment, each of the screw members 30 is inserted into the screw insertion hole 14 and the tip 31 of the screw member 30 is meshed with the screw meshing portion 27, whereby the clip member is attached to the lamp body 21. The one end 11a of the base portion 11 of the screw member 30 is inserted into the attachment hole 4, and thus the engagement portion 12 and the flange portion 13 are respectively engage with the back surface side and the front surface side of the lamp installation portion 3, whereby the turn lamp 20 is installed in the lamp installation portion 3. Accordingly, the turn lamp 20 is positioned and installed in the vehicle body 2 simultaneously by inserting the clip members 10 into the attachment holes 4, whereby assembling workability in a production line is improved.

Meanwhile, for parts replacement or inspection, while the lamp body 21 is kept installed in the vehicle body 2, each of the screw members 30 is turned from the back surface side of the lamp installation portion 3 in the loosening direction to thereby remove the turn lamp 20 from the clip member 10. This enables removal of the turn lamp 20 alone from the vehicle body 2, while the clip members 10 are left on lamp installation portion 3 of the vehicle body 2. In addition, no excessive load is applied on the clip members 10 in removing the turn lamp 20, whereby durability of the clip members 10 is improved.

In addition, when the turn lamp 20 removed from the vehicle body 2 for parts replacement or inspection is reinstalled in the vehicle body 2, the installation can be performed as follows. Specifically, positioning is performed by placing the lamp body 21 so that the screw meshing portions 27 of the lamp body 21 can correspond to the clip members 10 attached to the lamp installation portion 3, and then each of the screw members 30 is inserted into the screw insertion hole 14 of the clip member 10 from the back surface side of the lamp installation portion 3 and is turned in the fastening direction.

Meanwhile, when the turn lamp 20 is disengaged from the clip members 10 of the lamp installation portion 3, the fall prevention claws 28 are hooked on the peripheries of the hooking holes 5, whereby the falling of the turn lamp 20 can be prevented. In addition, when the above-described removed turn lamp 20 is reinstalled in the lamp installation portion 3, the fall prevention claws 28 is inserted into and hooked on the hooking holes 5, whereby the turn lamp 20 is temporarily held by the lamp installation portion 3. Accordingly, workability is excellent in reinstalling the turn lamp 20 in the lamp installation portion 3.

Furthermore, each of the engagement portions 12 of the clip members 10 attached to the two clip member insertion portions 26 located at positions near a reference edge 40 which is used as the positioning reference for the lamp installation portion 3 among the edges of the lamp body 21 is inserted into the corresponding attachment hole 4, whereby the lamp body 21 is installed in the lamp installation portion 3. In other words, the lamp body 21 is positioned near the reference edge 40. Accordingly, when a lamp lens 51 of a head lamp 50 is placed in contact with the lamp lens 22 fixed to the lamp body 21 and an outer edge 41 of the lamp lens 22 and an outer edge 52 of the lamp lens 51 of the head lamp 50 are adjacent to each other as shown in FIG. 1, the portion in contact with the lamp lens 51 of the head lamp 50 among the edges of the lamp body 21 (refer to FIG. 2) is used as the reference edge, whereby variation in position of the outer edge 41 of the lamp lens 22 relative to the outer edge 52 of the lamp lens 51 of the head lamp 50 can be limited to a small range. As a result, visual appearance is enhanced.

Note that, in the above-described embodiment, an example is shown in which the hooking hole 5 and the fall prevention claw 28 are formed in the lamp installation portion 3 and the lamp body 21, respectively. Alternatively, the hooking hole 5 and the fall prevention claw 28 may be formed in the lamp body 21 and the lamp installation portion 3, respectively.

Meanwhile, more than two of the screw meshing portions 27, more than two of the screw members 30, more than two of the clip members 10 or more than two of the attachment holes 4 may be provided.

In addition, the screw meshing portion 27 may be provided with a thread.

In addition, in the above-described embodiment, an example is shown in which the present invention is applied to the turn lamp installed in the front of the vehicle; alternatively, the present invention may be applied to a combination lamp, a head lamp and other lamps as well as to lamps installed in a place other than a vehicle front.

Hereinabove, description has been made of the embodiment to which the invention made by the present inventors is applied. However, the present invention is not limited to the description and the drawings which constitute a part of the disclosure of the present invention according to this embodiment. In other words, it is a matter of course that other embodiments, examples and operational techniques conducted by those skilled in the art on the basis of this embodiment are all included in the scope of the present invention.

Industrial Applicability

The lamp installation structure of the present invention can be applied to various vehicles.

The invention claimed is:

1. A lamp installation structure for vehicle comprising:
a lamp installation portion including an attachment hole penetrating from a front surface side to a back surface side of the lamp installation portion, as seen from an outer side of a vehicle body;
a connection member including:
   a base portion having one end and an other end, wherein the one end is arranged on a back surface side of the base portion and the other end is arranged on a front surface side of the base portion, as seen from the outer side of a vehicle body, and wherein the one end is configured to be inserted into the attachment hole from the front surface side of the lamp installation portion,
   an engagement portion which engages with the lamp installation portion to prevent the base portion from being detached from the attachment hole, when the one end of the base portion is inserted into the attachment hole, and
   a screw insertion hole provided to the base portion;
a screw member configured to be inserted into the screw insertion hole from the one end of the base portion; and
a lamp body including a meshing portion and mounted with a lamp, the meshing portion meshing with a tip of the screw member inserted into the screw insertion hole, the tip protruding from the other end of the base portion, wherein
one of the lamp installation portion and the lamp body has a hooking hole,
the other one of the lamp installation portion and the lamp body has a fall prevention claw which is inserted through the hooking hole with the lamp body installed in the lamp installation portion, and
when the lamp body is disengaged from the lamp installation portion, the fall prevention claw is hooked on a periphery of the hooking hole to prevent the lamp body from falling.

2. The lamp installation structure for vehicle according to claim 1, wherein
the meshing portion, the screw member and the connection member are each provided in a plurality,
the plurality of meshing portions are provided near a reference edge among edges of the lamp body, the reference edge being used as a positioning reference for the lamp body and the lamp installation portion,
each of the plurality of connection members is attached to the corresponding one of the plurality of meshing portions with the screw member, and
the plurality of attachment holes are located at respective predetermined positions corresponding to the plurality of meshing portions.

* * * * *